No. 650,462. Patented May 29, 1900.
G. HOLLIDAY.
KNEADING BOARD.
(Application filed Oct. 20, 1899.)

(No Model.)

Witnesses:
Inventor:
Gavin Holliday
By his attorneys,
Phillips & Anderson.

UNITED STATES PATENT OFFICE.

GAVIN HOLLIDAY, OF SAUGUS, MASSACHUSETTS.

KNEADING-BOARD.

SPECIFICATION forming part of Letters Patent No. 650,462, dated May 29, 1900.

Application filed October 20, 1899. Serial No. 734,193. (No model.)

*To all whom it may concern:*

Be it known that I, GAVIN HOLLIDAY, a citizen of the United States, residing at Saugus, in the county of Essex and State of Massachusetts, have invented certain new and useful Improvements in Kneading-Boards; and I do hereby declare the following to be a full, clear, and exact description of the invention, such as will enable others skilled in the art to which it appertains to make and use the same.

The present invention relates to an improvement in kneading-boards.

Heretofore it has been customary in rolling dough with a rolling-pin to turn the dough around at an angle to the direction of the previous stroke of the rolling-pin, so that the subsequent stroke thereof shall roll the dough in a different direction from the previous stroke.

The object of my invention is to make a kneading-board which may be turned around to present it to the rolling-pin at different angles.

To the above end the present invention consists in the kneading-board hereinafter described and claimed.

Figure 1:
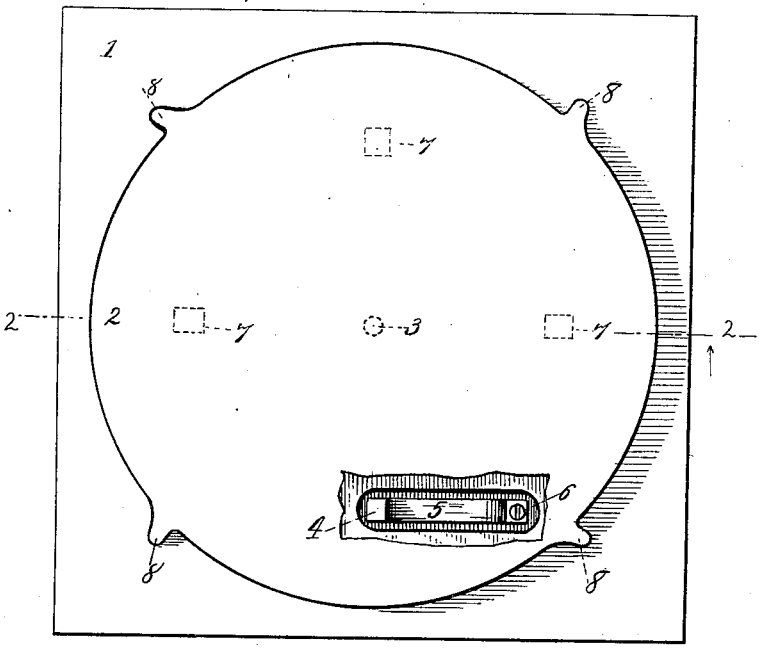
Figure 2:
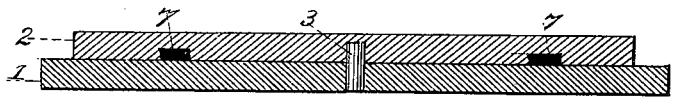
Figure 3:
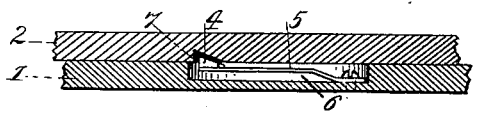

In the accompanying drawings, illustrating the preferred form of my invention, Figure 1 is a plan, Fig. 2 is a sectional elevation, and Fig. 3 is a section, of the board, showing the locking device hereinafter described.

My invention contemplates a dough-board and means for rotatably supporting said board thereon. Any suitable means may be employed to support the dough-board—such as the base 1, in which a pin 3 is fixedly secured and upon which the dough-board 2 loosely fits. The pin might, if preferred, be secured in the board and loosely engage the support. In use the dough will be laid upon the dough-board 2 and the rolling-pin will be rolled across the dough. Then the dough-board may be turned at an angle to the direction of the first stroke of the rolling-pin and again rolled. In this way the dough is stretched equally in all directions and easily turned from one position to another to secure this result. The dough-board 2 is easily turned by the hand or by the pressure of one end of the rolling-pin upon the board or dough.

While the device above described constitutes a complete and operative kneading-board embodying my invention, I prefer to employ in connection therewith a locking device which will permit the dough-board 2 to be turned in one direction and prevented from rotating in the opposite direction. Any suitable locking or latching device may be employed for this purpose, and it may be so arranged as to permit the rotation of the kneading-board in either the one direction or the other; but I prefer to so arrange the locking device that the kneading-board may be rotated to the right. The preferred embodiment of the locking device is illustrated in the drawings, in which a dog 4 is mounted in the base 1, which I preferably make in the form of a board, and pressed in a direction to engage the dough-board 2 by means of a spring. In the illustrated embodiment I have shown the spring as a flat piece of spring-metal 5, which is secured at the bottom of a recess 6 in the base-board by means of a screw. Upon the opposite side of the spring 5 the dog 4 is mounted. The under side of the dough-board 2 is provided with a number of locking-recesses 7, of which I prefer to employ four, situated at right angles to each other. The locking-dog 4 may be mounted either in the base-board 1, as shown, or it may be mounted in a similar manner in the dough-board 2, both of which constructions are within the spirit of my invention.

In order to facilitate the turning of the dough-board 2, I prefer to provide its periphery with a series of finger-receiving projections 8, of which any suitable number may be employed and which should preferably correspond in number to the number of locking-recesses 7.

The operation of the device is as follows: The turning of the board can be accomplished by engaging one of the finger-receiving projections with the hand and turning it through a right angle, the locking device holding the board from moving in the opposite direction after the partial rotation has been made.

It will be noted that after having been in use my kneading-board is capable of being taken apart for the purpose of cleaning the same, and for this purpose the dough-board is readily removable from the base upon which it is mounted, and that this board has no metal parts attached thereto which might rust and discolor the board.

Having thus described my invention, I claim as new and desire to secure by Letters Patent of the United States—

1. In a kneading-board, the combination with a dough-board, of means for rotatably supporting said board, substantially as described.

2. In a kneading-board, the combination with a base, of a dough-board rotatably mounted thereon, substantially as described.

3. In a kneading-board, the combination with a dough-board, of means for rotatably supporting said board and means for locking said board from rotation in one direction, substantially as described.

4. In a kneading-board, the combination with a dough-board, provided on its periphery with finger-receiving projections and means for rotatably supporting said board, substantially as described.

5. In a kneading-board, the combination with a dough-board provided on its periphery with finger-receiving projections, of means for rotatably supporting said board and means for locking said board from rotation in one direction, substantially as described.

6. In a kneading-board, the combination with a base, of a dough-board rotatably supported thereon, a spring-pressed locking device for locking the said board from rotation in one direction, substantially as described.

7. In a kneading-board, the combination with a base, provided with a pin, of a dough-board rotatably mounted on said pin, provided on its periphery with finger-receiving projections, and on its under side with a series of locking-recesses, and a locking device located in a recess in said base, consisting of a spring-pressed locking-dog adapted to project into said locking-recess and prevent the dough-board from rotation in one direction, substantially as described.

8. In a kneading-board, the combination with a base provided with a recess, provided in its center with a pin, of a circular dough-board provided in its periphery with finger-receiving projections and on its under side with a series of locking-recesses and a centrally-disposed hole to receive the said pin, and a locking device consisting of a spring secured to the bottom of the said recess in the base and provided with a locking-dog adapted to project upwardly to engage the locking-recesses in the kneading-board, substantially as described.

In testimony whereof I affix my signature in presence of two witnesses.

GAVIN HOLLIDAY.

Witnesses:
HORACE VAN EVEREN,
CHRISTIANA KITCHING.